(12) United States Patent
Ando

(10) Patent No.: US 9,597,608 B2
(45) Date of Patent: *Mar. 21, 2017

(54) CRYOPUMP SYSTEM

(71) Applicant: Sumitomo Heavy Industries, Ltd., Tokyo (JP)

(72) Inventor: Masamichi Ando, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 14/596,837

(22) Filed: Jan. 14, 2015

(65) Prior Publication Data

US 2015/0121907 A1    May 7, 2015

Related U.S. Application Data

(63) Continuation of application No. 13/471,136, filed on May 14, 2012, now Pat. No. 8,959,933.

(30) Foreign Application Priority Data

May 13, 2011  (JP) .................. 2011-108426

(51) Int. Cl.
  *B01D 8/00*   (2006.01)
  *F04B 37/08*  (2006.01)
  *F04B 41/06*  (2006.01)

(52) U.S. Cl.
  CPC ............. *B01D 8/00* (2013.01); *F04B 37/08* (2013.01); *F04B 41/06* (2013.01)

(58) Field of Classification Search
  CPC .................. F04B 37/08; B01D 8/00

USPC ........................................ 62/55.5
See application file for complete search history.

(56) References Cited

U.S. PATENT DOCUMENTS

| | | | |
|---|---|---|---|
| 4,679,401 A * | 7/1987 | Lessard | B01D 8/00 |
| | | | 417/901 |
| 4,724,677 A | 2/1988 | Foster | |
| 4,757,689 A * | 7/1988 | Bachler | F04B 37/08 |
| | | | 417/901 |
| 4,918,930 A * | 4/1990 | Gaudet | F04B 37/08 |
| | | | 417/901 |
| 4,958,499 A | 9/1990 | Haefner et al. | |
| 5,375,424 A | 12/1994 | Bartlett et al. | |
| 5,906,102 A | 5/1999 | Bartlett et al. | |
| 8,959,933 B2 * | 2/2015 | Ando | F04B 37/08 |
| | | | 62/55.5 |

FOREIGN PATENT DOCUMENTS

| | | |
|---|---|---|
| JP | 63-057881 A | 3/1988 |
| JP | H08-507115 A | 7/1996 |
| WO | WO-94-19608 A1 | 9/1994 |

\* cited by examiner

Primary Examiner — Melvin Jones
(74) Attorney, Agent, or Firm — Michael Best & Friedrich LLP

(57) ABSTRACT

A cryopump system includes: a plurality of cryopumps connected to a common roughing pump in a rough line and provided with a plurality of rough valves in the rough line, respectively; and a controller configured to control each of the rough valves for regenerating a corresponding one of the plurality of cryopumps. A delay time is set between closing of an open one of the plurality of rough valves and opening of a closed one of the plurality of rough valves. The controller applies the delay time uniformly upon closing of each of the rough valves.

6 Claims, 4 Drawing Sheets

CRYOPUMP SYSTEM

CROSS REFERENCE TO RELATED APPLICATION

The present application is a continuation of application Ser. No. 13/471,136 filed May 14, 2012, the contents of which, including specification, claims and drawings, are incorporated herein by reference in their entirety.

BACKGROUND OF THE INVENTION

Field of the Invention

The present invention relates to a cryopump system and a method for regenerating cryopumps.

Description of the Related Art

A cryopump is a vacuum pump that traps gas molecules by condensing or adsorbing them on cryopanels cooled to a cryogenic temperature so as to pump them. A cryopump is generally used to attain a clean vacuum environment required for semiconductor circuit manufacturing process, or the like. A cryopump is a so-called entrapment vacuum pump, in which regeneration is required on a regular basis for discharging the trapped gas to the outside. A roughing pump may be used for the discharging.

SUMMARY OF THE INVENTION

According to an aspect of the present invention, there is provided a cryopump system including: a plurality of cryopumps connected to a common roughing pump and provided with a plurality of rough valves, respectively; and a controller configured to control each of the rough valves for regenerating a corresponding one of the plurality of cryopumps. A delay time is set between closing of an open one of the plurality of rough valves and opening of a closed one of the plurality of rough valves.

According to another aspect of the present invention, there is provided a method for regenerating a plurality of cryopumps, the plurality of cryopumps being connected to a common rough line. The method includes: first rough-pumping a cryopump through the rough line; and second rough-pumping another cryopump through the rough line after a delay time passes from the first rough pumping.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

In a vacuum system having a plurality of cryopumps, a roughing vacuum pump may be shared by some cryopumps. To reduce a regeneration time of the plurality of cryopumps as a whole, they are preferably regenerated in parallel. When the roughing pump is switched from a cryopump to another cryopump, these cryopumps generally have different pressures.

One of exemplary purposes of an aspect of the present invention is to alleviate an influence on a regeneration process caused by the difference in pressure between the plurality of cryopumps.

Figure 1:
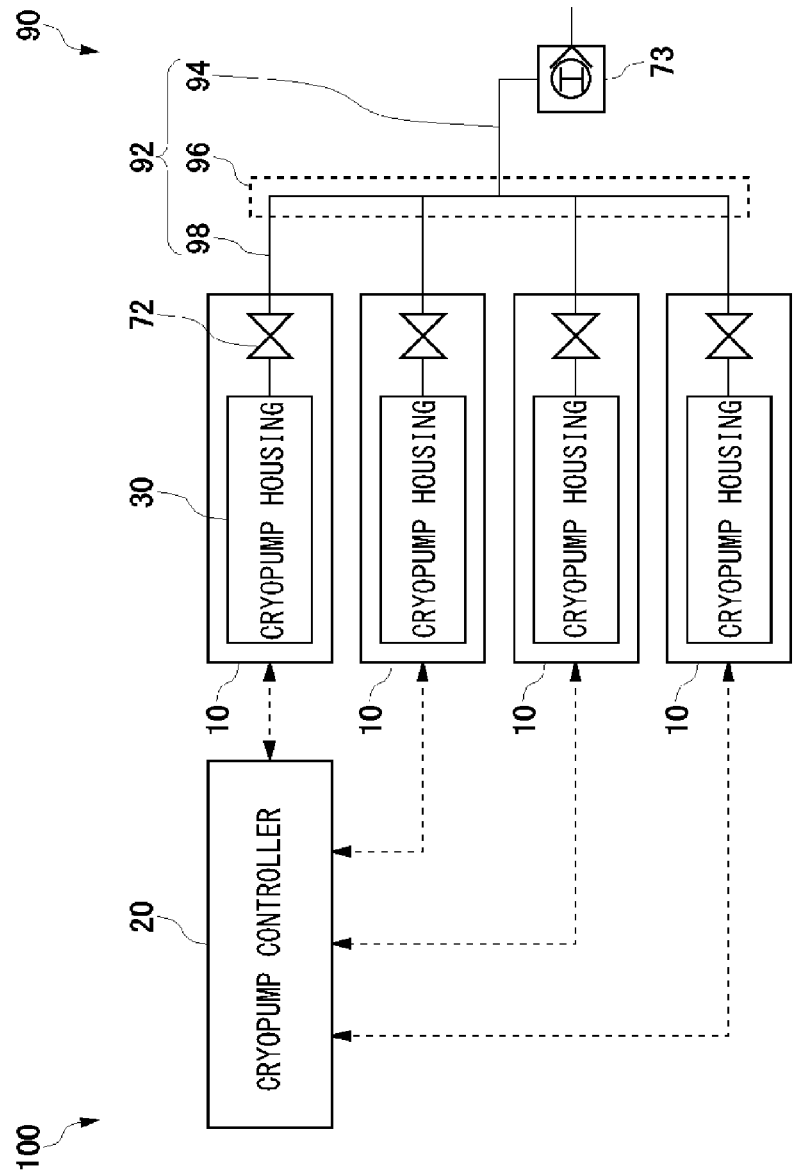
FIG. 1 shows a diagram schematically illustrating a configuration of a cryopump system according to an exemplary embodiment of the present invention.

FIG. 1 shows a diagram schematically illustrating a configuration of a cryopump system 100 according to an exemplary embodiment of the present invention. The cryopump system 100 is used for vacuum evacuation of a vacuum chamber (not shown) in a vacuum processing apparatus that processes an object in a vacuum environment. The vacuum processing apparatus is an apparatus used in a semiconductor manufacturing process, such as an ion implantation apparatus or a sputtering apparatus.

The cryopump system 100 includes a plurality of cryopumps 10. The cryopumps 10 are mounted on a vacuum chamber and are used to increase the vacuum level inside the vacuum chamber (not shown) to a level required by a desired process. For example, a high vacuum level of about $10^{-5}$ Pa to $10^{-8}$ Pa is attained in the vacuum chamber. Each of the cryopumps 10 has a cryopump housing 30 that contains the components of a cryopump 10, and a rough valve 72 that is provided with the pump housing 30. A configuration of the cryopump 10 according to an exemplary embodiment will be described in detail below with reference to FIG. 2.

The cryopump system 100 has a cryopump controller (hereinafter also referred to as "CP controller") 20. The CP controller 20 controls the cryopumps 10. That is, the cryopumps 10 are operated according to a control command determined by the CP controller 20. The CP controller 20 also controls opening/closing of the rough valves 72.

The CP controller 20 has, for example, a CPU that executes various computation processes, a ROM that stores various control programs, a RAM that is used as a work area to store data or execute programs, an input/output interface and a memory. Further, the CP controller 20 is configured to communicate with a host controller (not shown) that controls a vacuum processing apparatus. The CP controller 20 is formed separately from or integrally with the cryopumps 10. In FIG. 1, control communication lines between the cryopumps 10 and the CP controller 20 are indicated by broken lines.

A rough line 90 is provided with the cryopumps 10 for use in rough pumping of them. The cryopump system 100 may include the rough line 90, or a vacuum processing apparatus that is evacuated by the cryopump system 100 may include the rough line 90. The rough line 90 may be part of a vacuum evacuation system configured to provide vacuum evacuation for the cryopump system 100 and/or the vacuum processing apparatus. The vacuum evacuation system may include the cryopump system 100.

The rough line 90 is provided for use in rough pumping of the plurality of cryopumps 10. The cryopumps 10 are connected to the common rough line 90. The rough line 90 has a roughing vacuum pump 73 and rough piping 92. The roughing pump 73 is commonly provided for the plurality of cryopumps 10, and the plurality of cryopumps 10 share the roughing pump 73. Two or more roughing vacuum pumps 73 may be provided and these roughing pumps may be shared by a plurality of cryopumps 10. The roughing pump 73 may be connected to a vacuum chamber of the vacuum processing apparatus, and used for evacuation of this vacuum chamber.

The roughing pump 73 is a vacuum pump that vacuums the plurality of cryopumps 10, and is preferably a rough pump or a dry pump. The cryopumps 10 are main pumps for a vacuum chamber, and the roughing pump 73 is an auxiliary pump. The roughing pump 73 is a vacuum pump that provides in each cryopump 10 a base pressure level that is an initial pressure for the cryopump 10 in operation, in other words, a low vacuum region of an operating pressure range of the cryopump 10. The roughing pump 73 can reduce the pressure in the cryopump housings 30 from atmospheric pressure to the base pressure level. The base pressure level corresponds to a high vacuum region of the roughing pump 73, and is included in an overlapping portion of operating pressure ranges of the roughing pump 73 and the cryopumps 10. The base pressure level is in, for example, a range equal to or more than 1 Pa and equal to and less than 10 Pa.

The rough piping 92 connects rough valves 72 for the plurality of cryopumps 10 to the roughing pump 73. The rough valves 72 may be regarded as part of the rough line 90. The rough piping 92 has a roughing-pump pipe 94, a branching portion 96 and cryopump pipes 98.

The roughing-pump pipe 94 connects the roughing pump 73 to the branching portion 96. The cryopump pipes 98 are each provided for the plurality of cryopumps 10, and connect the respective cryopumps 10 and the branching portion 96. The cryopump pipes 98 connect the respective rough valves 72 to the branching portion 96. At the branching portion 96, the cryopump pipes 98 join the roughing-pump pipe 94. The branching portion 96 may be, for example, manifold. Part of the rough piping 92 may be included in the vacuum processing apparatus.

Thus, the plurality of cryopumps 10 are connected to the roughing pump 73 in parallel. An exhausted gas flow through the cryopump pipes 98 are collected through the branching portion 96 to the roughing-pump pipe 94.

The rough valve 72 is a vacuum valve for connecting or isolating its corresponding cryopump 10 to or from the roughing pump 73. Each of the rough valves 72 is connected to the roughing pump 73 through the rough piping 92. The rough valve 72 is opened for communication between the corresponding cryopump housing 30 and the roughing pump 73. The rough valve 72 is closed for isolating the corresponding cryopump housing 30 from the roughing pump 73. By opening the rough valve 72 and operating the roughing pump 73, the inside of the corresponding cryopump 10 can be depressurized to the base pressure level.

In addition, the rough valves 72 may not be respectively mounted on the plurality of cryopumps 10. For example, a switching mechanism configured to switch connection of the roughing pump 73 to at least one selected cryopump 10 may be provided in the middle of the rough line 90. This switching mechanism may be regarded as the rough valve 72.

The rough valve 72 is opened when receiving an opening command from a valve control unit such as the CP controller 20, and is closed when receiving a closing command. During the vacuum pumping operation of a cryopump 10, the corresponding rough valve 72 is closed. During the regeneration of a cryopump 10, the corresponding rough valve 72 is allowed to open. The rough valve 72 is selectively and exclusively opened. The rough valves 72 connected to the roughing pump 73 are not open at the same time. That is, when one of the plurality of rough valves 72 is open, the other rough valves 72 are closed. Thus, the common roughing pump 73 individually pumps a gas in each cryopump 10.

The CP controller 20 allows the plurality of cryopumps 10 to be regenerated at the same time or in parallel. In this case, a request of rough pumping for a certain cryopump 10 may be generated while a different cryopump 10 is being rough pumped. Hence, the CP controller 20 adjusts the order of rough pumping of the plurality of cryopumps 10.

For example, the CP controller 20 sequentially executes a plurality of requests of rough pumping one by one in the order that the requests have been generated. The CP controller 20 prohibits the remaining cryopumps 10 from rough pumping before the running rough pumping for a specific cryopump 10 has been completed. When a new request of rough pumping for one of the remaining cryopumps 10 is generated during the running rough pumping, the CP controller 20 suspends the new request before the rough pumping processes in accordance with all the requests that have been ever generated are completely executed.

The CP controller 20 may re-order the roughing processes between the plurality of cryopumps 10 if required. Hence, the CP controller 20 may set priority on a certain cryopump 10 or the corresponding request of rough, and determine the roughing order based on the priority.

Figure 2:
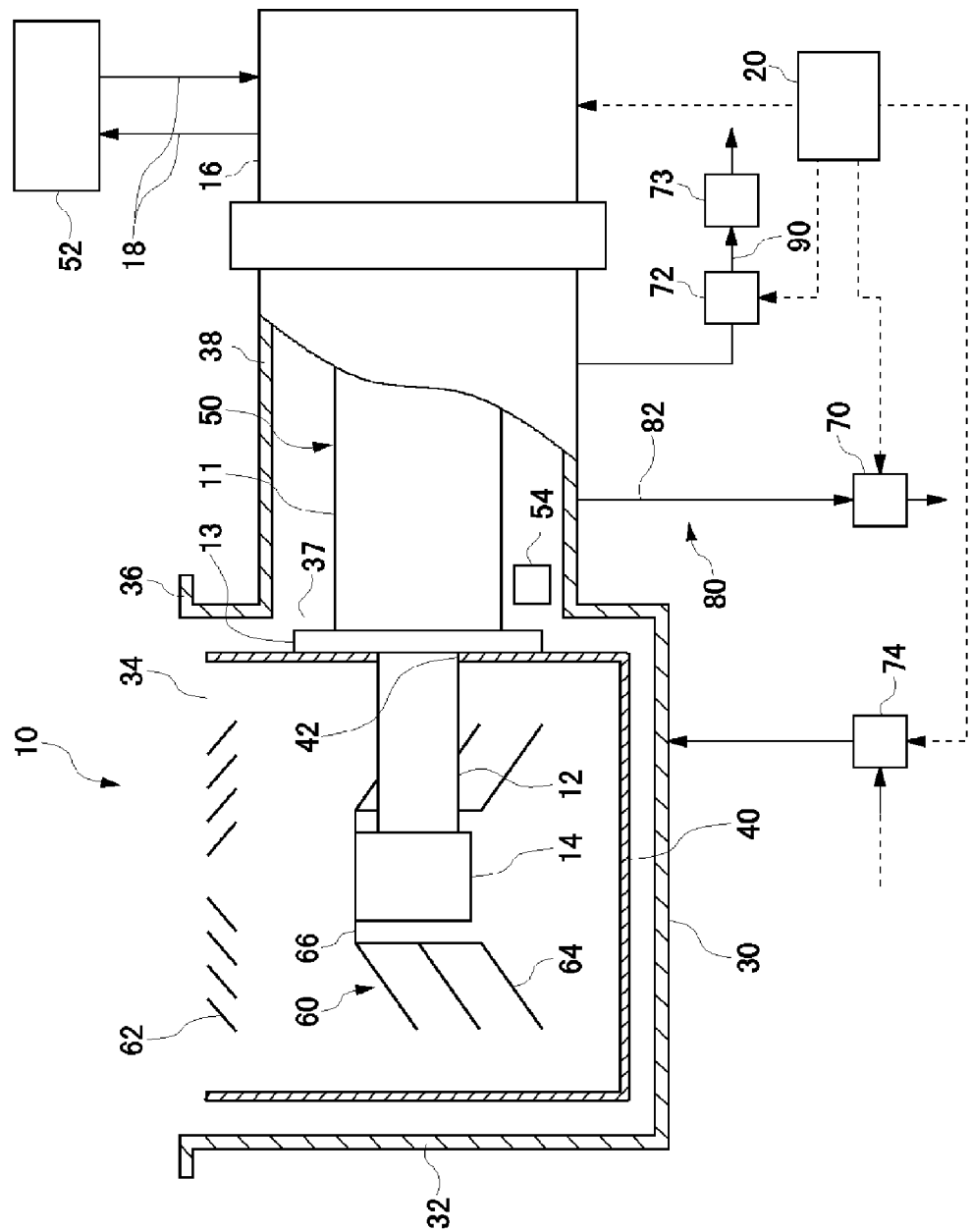
FIG. 2 shows a diagram schematically illustrating a cryopump according to an exemplary embodiment of the present invention.

FIG. 2 shows a diagram schematically illustrating the cryopump 10 according to an exemplary embodiment of the present invention. The cryopump 10 has the cryopump housing 30, a radiation shield 40 and a refrigerator 50.

The refrigerator 50 is, for example, a Gifford-McMahon refrigerator (so-called GM refrigerator) or the like. The refrigerator 50 is provided with a first cylinder 11, a second cylinder 12, a first cooling stage 13, a second cooling stage 14, and a valve drive motor 16. The first cylinder 11 and the second cylinder 12 are connected in series. The first cooling stage 13 is installed at a coupling portion side where the first cylinder 11 is connected to the second cylinder 12, and the second cooling stage 14 is installed on the second cylinder 12 at the end that is farthest from the first cylinder 11. The refrigerator 50 shown in FIG. 2 is a two-stage refrigerator and achieves lower temperature by combining two cylinders in series. The refrigerator 50 is connected to a compressor 52 through a refrigerant pipe 18.

The compressor 52 compresses a refrigerant gas, i.e., an operating gas, such as helium or the like, and supplies the gas to the refrigerator 50 through the refrigerant pipe 18. While cooling the operating gas by allowing the gas to pass through a regenerator, the refrigerator 50 further cools the gas by expanding the gas first in an expansion chamber inside the first cylinder 11 and in an expansion chamber in the second cylinder 12. The regenerator is installed inside the expansion chambers. Thereby, the first cooling stage 13 installed on the first cylinder 11 is cooled to a first cooling temperature level while the second cooling stage 14 installed on the second cylinder 12 is cooled to a second cooling temperature level lower than the first cooling temperature level. For example, the first cooling stage 13 is cooled to about 65 K to 100 K, while the second cooling stage 14 is cooled to about 10 K to 20 K.

The operating gas, which has absorbed heat by expanding in the respective expansion chambers and cooled respective cooling stages, passes through the regenerator again and is returned to the compressor 52 through the refrigerant pipe

18. The flows of the operating gas from the compressor 52 to the refrigerator 50 and from the refrigerator 50 to the compressor 52 are switched by a rotary valve (not shown) in the refrigerator 50. The valve drive motor 16 rotates the rotary valve with power supplied from an external power source.

The CP controller 20 controls the refrigerator 50 based on the cooling temperature of the first cooling stage 13 or the second cooling stage 14. For this purpose, a temperature sensor (not shown) may be provided on the first cooling stage 13 or on the second cooling stage 14. The CP controller 20 may control the cooling temperature by controlling the driving frequency of the valve drive motor 16. For this purpose, the CP controller 20 may comprise an inverter for controlling the valve drive motor 16. The CP controller 20 may be configured so as to control the compressor 52 and respective valves, which will be described later.

The cryopump 10 illustrated in FIG. 2 is a so-called horizontal-type cryopump. In the horizontal-type cryopump, the second cooling stage 14 of the refrigerator is generally inserted into the radiation shield 40 along the direction that intersects with the axis of the cylindrical radiation shield 40 (usually in an orthogonal direction). In addition, the present invention is also applicable to a so-called vertical-type cryopump in a similar way. In the vertical-type cryopump, the refrigerator is inserted along the axis of the radiation shield.

The cryopump housing 30 has a portion 32 formed into a cylindrical shape (hereinafter, referred to as a "trunk portion") 32, one end of which being provided with an opening and the other end being closed. The opening is provided as a pump inlet 34 for receiving a gas to be evacuated from the vacuum chamber of a sputtering apparatus or the like, to which the cryopump is to be connected. The pump inlet 34 is defined by the interior surface of the upper end of the trunk portion 32 of the cryopump housing 30. Further, on the trunk portion 32, an opening 37 for inserting the refrigerator 50 is formed in addition to the pump inlet 34. One end of a cylindrically shaped refrigerator container 38 is fitted to the opening 37 on the trunk portion 32 while the other end thereof is fitted to the housing of the refrigerator 50. The refrigerator container 38 contains the first cylinder 11 of the refrigerator 50.

Further, at the upper end of the trunk portion 32 of the cryopump housing 30, a mounting flange 36 extends outwardly in the radial direction. The cryopump 10 is mounted, by using the mounting flange 36, to a vacuum chamber to which the cryopump 10 is to be mounted.

The cryopump housing 30 is provided in order to separate the inside of the cryopump 10 from the outside thereof. As described above, the cryopump housing 30 is configured to include the trunk portion 32 and the refrigerator container 38, and the trunk portion 32 and the refrigerator container 38 are gastight and the respective insides thereof are maintained at a common pressure. This allows the cryopump housing 30 to function as a vacuum vessel during the pumping operation of the cryopump 10. The exterior surface of the cryopump housing 30 is exposed to the environment outside the cryopump 10 during the operation of the cryopump 10, i.e., even during the operation of the refrigerator. Therefore the exterior surface is maintained at a temperature higher than that of the radiation shield 40. The temperature of the cryopump housing 30 is typically maintained at an ambient temperature. Hereinafter, the ambient temperature refers to a temperature of the place where the cryopump 10 is installed or a temperature close to the temperature. The ambient temperature may be, for example, at or around room temperature.

Further, a pressure sensor 54 is provided in the refrigerator container 38 of the cryopump housing 30. The pressure sensor 54 periodically measures the internal pressure of the refrigerator container 38, i.e., the pressure in the cryopump housing 30 and outputs a signal indicating the measured pressure to the CP controller 20. The pressure sensor 54 is connected to the CP controller 20 so that the output thereof can be communicated. Alternatively, the pressure sensor 54 may be provided in the trunk portion 32 of the cryopump housing 30.

The pressure sensor 54 has a wide measurement range including both a base pressure level attained by the roughing pump 73 and the atmospheric pressure level. It is desirable that at least a pressure range, which can occur during a regeneration process, is included in the measurement range. In the present embodiment, it is preferable to use, for example, a crystal gauge as the pressure sensor 54. The crystal gauge refers to a sensor that measures a pressure by using a phenomenon in which the oscillation resistance of a crystal oscillator varies with a pressure. Alternatively, the pressure sensor 54 may be a Pirani gauge. In addition, a pressure sensor for measuring a vacuum level and a pressure sensor for measuring an atmospheric pressure level may be provided in the cryopump 10, separately.

A vent valve 70, a rough valve 72 and a purge valve 74 are connected to the cryopump housing 30. The opening/closing of each of the vent valve 70, the rough valve 72, and the purge valve 74 are controlled by the CP controller 20.

The vent valve 70 is provided, for example, at the end of an exhaust line 80. Alternatively, the vent valve 70 may be provided at the middle of the exhaust line 80 and a tank or the like for collecting released fluid may be provided at the end of the exhaust line 80. By opening the vent valve 70, the flow of fluid in the exhaust line 80 is permitted, and by closing the vent valve 70, the flow of fluid in the exhaust line 80 is blocked. Although the fluid to be exhausted is basically gas, the fluid may be liquid or a mixture of gas-liquid. For example, liquefied gas that has been condensed by the cryopump 10 may be mixed with the fluid to be exhausted. By allowing the vent valve 70 to open, the positive pressure occurred in the cryopump housing 30 can be released to the outside.

The exhaust line 80 includes an exhaust duct 82 for exhausting fluid from the internal space of the cryopump 10 to an external environment. The exhaust duct 82 is, for example, connected to the refrigerator container 38 of the cryopump housing 30. Although the exhaust duct 82 is a duct having a circular cross section orthogonal to the direction of the flow, the exhaust duct 82 may have a cross section of any other shapes. The exhaust line 80 may include a filter for removing foreign bodies from the fluid to be exhausted through the exhaust duct 82. This filter may be provided upstream from the vent valve 70 in the exhaust line 80.

The vent valve 70 is configured to also function as a so-called safety valve. The vent valve 70 is, for example, a normally closed type control valve that is provided in the exhaust duct 82. Further, the strength of a force required to close the vent valve 70 is defined in advance so that the vent valve 70 opens mechanically when being subject to a predetermined differential pressure. The predetermined differential pressure can be set as appropriate by, for example, taking into consideration the internal pressure that can be exerted upon the cryopump housing 30, the structural durability of the cryopump housing 30, or the like. Since the external environment of the cryopump 10 is normally at an atmospheric pressure, the predetermined differential pressure is set to a predetermined value relative to the atmospheric pressure.

The vent valve 70 is typically opened by the CP controller 20 when fluid is released from the cryopump 10, for example, during the regeneration process. When fluid should not be released, the vent valve 70 is closed by the CP controller 20. On the other hand, the vent valve 70 is mechanically opened when the defined differential pressure is exerted thereupon. As a result, when the internal pressure of the cryopump rises too high for some reasons, the vent valve 70 is opened mechanically without requiring control. Thereby, the internal high pressure can be released. In this manner, the vent valve 70 functions as a safety valve. Combining the vent valve 70 with a safety valve in this way leads to advantages of cost reduction and space saving in comparison with a case where two valves are separately provided.

The purge valve 74 is connected to a purge gas supply apparatus (not shown). The purge gas is, for example, a nitrogen gas. The CP controller 20 controls the purge valve 74, thereby controlling the supply of the purge gas to the cryopump 10.

The radiation shield 40 is arranged inside the cryopump housing 30. The radiation shield 40 is formed as a cylindrical shape, one end of which being provided with an opening and the other end being closed, i.e., a cup-like shape. The radiation shield 40 may be formed as a one-piece cylinder as illustrated in FIG. 2 or a plurality of parts may form a cylindrical shape as a whole. The plurality of parts may be arranged so as to have a gap between one another.

The trunk portion 32 of the cryopump housing 30 and the radiation shield 40 are both formed as substantially cylindrical shapes and are arranged concentrically. The inner diameter of the trunk portion 32 of the cryopump housing 30 is larger than the outer diameter of the radiation shield 40 to some extent, and therefore, the radiation shield 40 is arranged in the cryopump housing 30 without contact, spaced reasonably apart from the interior surface of the trunk portion 32 of the cryopump housing 30. That is, the outer surface of the radiation shield 40 faces the inner surface of the cryopump housing 30. In addition, the shapes of the trunk portion 32 of the cryopump housing 30 and the radiation shield 40 are not limited to cylindrical but may be tubes having a rectangular or elliptical cross section, or any other cross section. Typically, the shape of the radiation shield 40 is analogous to the shape of the interior surface of the trunk portion 32 of the cryopump housing 30.

The radiation shield 40 is provided as a radiation shield that protects the second cooling stage 14 and a low temperature cryopanel 60, which is thermally connected to the second cooling stage 14, from radiation heat emitted mainly from the cryopump housing 30. The second cooling stage 14 is arranged inside the radiation shield 40, substantially on the central axis of the radiation shield 40. The radiation shield 40 is fixed to the first cooling stage 13 so as to be thermally connected to the stage 13, and is cooled to a temperature comparable to that of the first cooling stage 13.

The low temperature cryopanel 60 includes, for example, a plurality of panels 64. Each of the panels 64 has a shape of the side surface of a truncated cone, i.e., an umbrella-like shape. Each panel 64 is attached to a panel mounting member 66 that is fixed to the second cooling stage 14. Typically, an adsorbent (not shown) such as charcoal or the like is provided on each panel 64. The adsorbent is attached to, for example, the back face of the panel 64. A plurality of the panels 64 are mounted to the panel mounting member 66 with spaces between one another. A plurality of the panels 64 are arranged in the direction toward inside of the pump from the pump inlet 34.

A baffle 62 is provided in the inlet of the radiation shield 40 in order to protect both the second cooling stage 14 and the low temperature cryopanel 60, which is thermally connected to the stage 14, from radiation heat emitted from a vacuum chamber or the like. The baffle 62 is formed as, for example, a louver structure or a chevron structure. The baffle 62 may be formed as circular shapes concentrically arranged around the central axis of the radiation shield 40 or may be formed in another shape such as a lattice or the like. The baffle 62 is mounted at the opening end of the radiation shield 40 and cooled to a temperature comparable to that of the radiation shield 40.

A refrigerator mounting opening 42 is formed on the side surface of the radiation shield 40. The refrigerator mounting opening 42 is formed on the side surface of the radiation shield 40 at the middle in the central axis of the radiation shield 40. The refrigerator mounting opening 42 of the radiation shield 40 is provided coaxially with the opening 37 of the cryopump housing 30. The second cylinder 12 and the second cooling stage 14 of the refrigerator 50 are inserted through the refrigerator mounting opening 42 in the direction perpendicular to the central axis of the radiation shield 40. The radiation shield 40 is fixed to the first cooling stage 13 so as to be thermally connected to the stage, at the refrigerator mounting opening 42.

An explanation on the operations of the cryopump 10 with the aforementioned configuration will be given below. When activating the cryopump 10, the inside of the cryopump housing 30 is first roughly evacuated to approximately 1 Pa to 10 Pa by using a roughing pump 73 through the rough valve 72 before starting the operation. The pressure is measured by the pressure sensor 54. Thereafter, the cryopump 10 is operated. By driving the refrigerator 50 under the control of the CP controller 20, the first cooling stage 13 and the second cooling stage 14 are cooled, thereby the radiation shield 40, the baffle 62, and the cryopanel 60, which are thermally connected to the stages, are also cooled.

The cooled baffle 62 cools the gas molecules flowing from the vacuum chamber into the cryopump 10 so that a gas whose vapor pressure is sufficiently low at the cooling temperature (e.g., water vapor or the like) will be condensed and pumped on the surface of the baffle 62. A gas whose vapor pressure is not sufficiently low at the cooling temperature of the baffle 62 passes through the baffle 62 and enters inside of the radiation shield 40. Of the gas molecules that have been entered, a gas whose vapor pressure is sufficiently low at the cooling temperature of the cryopanel 60 will be condensed and pumped on the surface of the cryopanel 60. A gas whose vapor pressure is not sufficiently low at the cooling temperature (e.g., hydrogen or the like) is adsorbed and pumped by an adsorbent, which is attached to the surface of the cryopanel 60 and cooled. In this way, the cryopump 10 can attain a desired vacuum level in the vacuum chamber to which the pump is mounted.

As pumping operation continues, gas is accumulated in the cryopump 10. In order to discharge the accumulated gas to the outside, a regeneration of the cryopump 10 is executed if a predetermined time period has been passed after starting the pumping operation or if a predetermined condition for starting the regeneration is satisfied. A regeneration procedure includes a heating process, a discharging process, and a cooling process.

The regeneration procedure of the cryopump 10 is controlled, for example, by the CP controller 20. The CP controller 20 determines whether or not the predetermined condition for starting the regeneration is satisfied, and in case that the condition is satisfied, starts to regenerate the pump. In this case, the CP controller 20 stops the cooling operation of the refrigerator 50 for cooling the cryopanels and starts the heating operation, more specifically rapid heating operation, of the refrigerator 50. In case that the condition is not satisfied, the CP controller 20 does not start the regeneration and, for example, continues the vacuum pumping operation.

Figure 3:
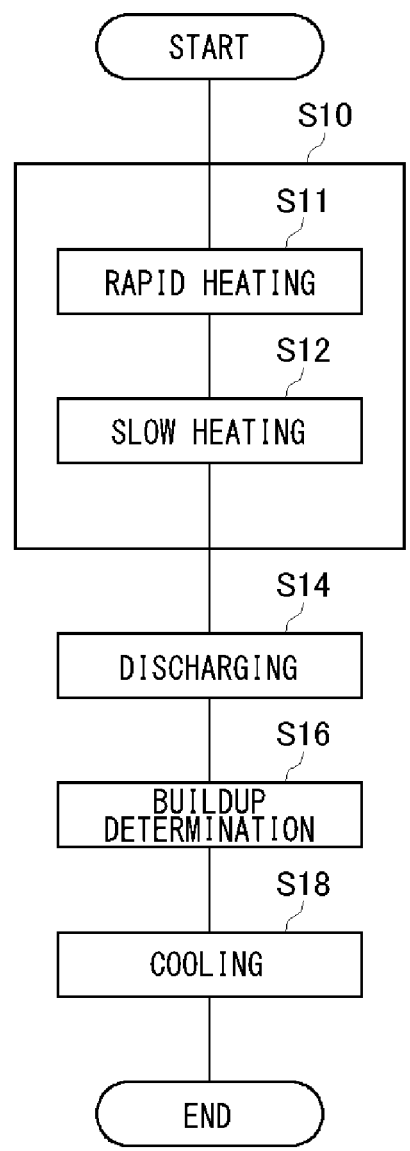
FIG. 3 shows a flowchart for describing a regenerating method according to an exemplary embodiment of the present invention.

FIG. 3 shows a flowchart for illustrating a regeneration method according to an exemplary embodiment of the present invention. The regeneration procedure includes a heating process or step for heating the cryopump 10 to a regeneration temperature, which is higher than the temperature of the cryopanels during the pumping operation. The exemplary regeneration process shown in FIG. 3 is so-called, full regeneration. The full regeneration regenerates all cryopanels including the low temperature cryopanel 60 and the baffle 62. The cryopanels are heated from a cooling temperature for the vacuum pumping operation to a regeneration temperature, for example near ambient temperature (for example, about 300 K).

The heating process includes reverse-rotation heating. According to an exemplary embodiment, the reverse-rotation heating differentiates timings of intake and discharge of the operating gas from those of the cooling operation so as to cause adiabatic compression to the operating gas by rotating the rotary valve in the refrigerator 50 in the reverse direction from that of the cooling operation. Compression heat obtained in this manner heats the cryopanels.

As shown in FIG. 3, according to an exemplary embodiment, the heating step includes rapid heating (S11) and slow heating (S12). The rapid heating heats the cryopanels at relatively high-speed from a cooling temperature of the cryopanel during the cooling operation to a threshold temperature for switching the heating speed. The slow heating heats the cryopanels at speed lower than that of the rapid heating from the threshold temperature for switching the heating speed to the regeneration temperature. The threshold temperature for switching the heating speed is, for example a temperature selected from a temperature range from 200 K to 250 K. It should be noted that the heating in two phases in the manner described above is not necessarily required. The cryopanels may be heated at a constant temperature rising speed, or may be heated by a heating process having more than two phases each of which a respective temperature rising speed is assigned to.

During the heating process, the CP controller 20 controls the valve drive motor 16 so as to rotate at higher speed during the rapid heating than the speed thereof during the slow heating. During the rapid heating, the CP controller 20 determines whether or not a measured value of the cryopanel temperature reaches the threshold temperature for switching the heating speed. The CP controller 20 continues rapid heating until the measured value reaches the threshold temperature, and switches from the rapid heating to the slow heating in case that the measured value reaches the threshold temperature. During the slow heating, the CP controller 20 determines whether or not a measured value of the cryopanel temperature reaches the regeneration temperature. The CP controller 20 continues the slow heating until the measured value reaches the regeneration temperature, and completes the heating process and starts the subsequent process, i.e., discharging step in case that the measured value reaches the regeneration temperature.

The discharging step discharges gas, which is re-evaporated from the surface of the cryopanels, to the outside of the cryopump 10 (S14). The re-evaporated gas is discharged outside, for example, via the exhaust line 80, or by using the roughing pump 73. The re-evaporated gas is exhausted from the cryopump 10 with purge gas that is infused as necessary. During the discharging step, the heating operation of the refrigerator 50 may be continued, or the operation of the refrigerator 50 may be stopped.

According to an exemplary embodiment, the discharging step may include a so-called rough-and-purge step. This is a step of discharging a gas by repeating rough pumping through the rough line 90 and infusion of a purge gas. An initial pressure and a final pressure are set for a roughing step of the cryopump 10 through the rough line 90. The initial pressure is, for example, atmospheric pressure. The final pressure is higher than the base pressure level, and is selected from, for example, a range of 50 Pa to 500 Pa and, more preferably, a range of 100 Pa to 300 Pa. This pressure region is referred to as a "semi-base pressure level" below. According to another embodiment, the final pressure may be the base pressure level. The internal pressure of the cryopump during the rough-and-purge step goes back and forth within the pressure region defined by these initial and final pressures in an oscillating manner.

The present regeneration method includes a step of determining whether or not the gas has been discharged based on a pressure, which may be referred as a buildup determination step (S16). The buildup determination is executed between the discharging step and the cooling step. The buildup determination may be regarded as part of the discharging step. For the buildup determination, the valves including the rough valve 72 are closed, and the cryopump housing 30 is maintained gastight. If the gas is completely discharged (in addition, if there is no leakage, strictly speaking), the pressure of the cryopump housing 30 will be maintained.

Hence, the CP controller 20 determines whether or not the gas has been discharged based on a rate of pressure rise, that is, whether or not a rise in pressure occurs within a determination time. A pressure threshold for detecting the pressure rise is set in advance. In order to perform the buildup determination, the CP controller 20 uses, for example, a pressure measured value inside the cryopump 10 that is measured by the pressure sensor 54.

The CP controller 20 controls to transition to the next step, e.g., the cooling step, if the buildup determination indicates "pass", that is, if the CP controller 20 determines that no pressure rise occurs. The CP controller 20 controls to return to the discharging step if the buildup determination indicates "failure", that is, if the CP controller 20 determines that the pressure rise has occurred. When returning to the discharging step, the CP controller 20 may perform the buildup determination step again after re-rough only or rough-and-purge.

In an embodiment, the CP controller 20 may execute the buildup determination step configured to include multiple sub-steps. For example, the CP controller 20 may execute a first buildup determination sub-step performed in a low vacuum region, and a second buildup determination sub-step performed in a vacuum region higher than the low vacuum region. The first buildup determination may be directed to determining whether or not the final pressure in the rough-and-purge step is maintained. In other words, the first buildup determination may be directed to determining whether or not the semi-base pressure level is maintained.

For the cryopump 10 which has passed the first buildup determination, the pressure is reduced to a lower pressure, e.g., the base pressure level, through the rough line 90. The second buildup determination may be directed to determining whether or not the base pressure level is maintained. The cryopump 10 which has passed the second buildup determination is controlled to transition to the cooling step. The cryopump 10 which has failed to pass the buildup determination in any one of the sub-steps is controlled to continue the discharging step including the buildup determination.

The cooling step re-cools the cryopanels in order to restart the vacuum pumping operation (S16). The cooling operation of the refrigerator 50 is started. Rough pumping may also be performed in at least part of the cooling step. The rough pumping may be continued, for example, from the start of the cooling step until the pressure and/or the temperature reaches a rough finish pressure and/or a rough finish temperature, respectively. The CP controller 20 determines whether or not a measured value of the cryopanel temperature reaches a cryopanel cooling temperature for the vacuum pumping operation. The CP controller 20 continues the cooling step until the measured value reaches the cryopanel cooling temperature, and completes the cooling step in case that the measured value reaches the cooling temperature. In this manner, the regeneration procedure is completed. The vacuum pumping operation of the cryopump 10 is restarted.

As described above, the CP controller 20 allows the plurality of cryopumps 10 to be regenerated at the same time or in parallel. In fact, regeneration should be executed during a down time of the vacuum processing apparatus or during a period in which a vacuum process is not performed in the apparatus, and therefore the plurality of cryopumps 10 are usually regenerated in parallel.

To reduce the regeneration time of the plurality of cryopumps 10 in total, it is preferable to regenerate them in parallel instead of sequentially regenerating the cryopumps 10 one by one. If the regeneration could be completely synchronized in each of the plurality of cryopumps 10 to start and finish it at the same time, the rough valves 72 of the cryopumps 10 in regeneration would be opened/closed at the same time. However, the cryopumps 10 may contain different amounts of accumulated gas and may have individual differences in performance, and therefore completely synchronized regeneration may be impractical.

Hence, parallel regeneration is employed for the plurality of cryopumps 10. Such parallel regeneration may include a reconnecting operation of the roughing pump 73 from one cryopump 10 to another cryopump 10.

Immediately after the rough valve 72 of a cryopump 10 is closed and the rough pumping is completed, the pressure in the rough piping 92 is at the level of the final pressure of the rough pumping. A period of time (for example, about several seconds) is required to further depressurize the rough piping 92 to a lower pressure level, e.g., the ultimate vacuum pressure of the roughing pump 73. The internal pressures may be different when different steps in regeneration are executed in the individual cryopumps 10. Hence, a cryopump 10 to be rough pumped next may have a lower internal pressure than the pressure in the rough piping 92. In this case, the cryopump 10 may be transiently or temporarily pressurized due to the higher pressure in the rough piping 92. Further, particles may enter into the cryopump 10 together with the reverse flow occurring from the rough piping 92 into the cryopump 10.

Hence, according to an exemplary embodiment of the present invention, the cryopump system 100 is configured such that, before rough pumping of a certain cryopump 10 has been finished, another cryopump 10 in which rough pumping is subsequently performed is on standby. Further, even if the rough pumping of the certain cryopump 10 has been finished, the cryopump system 100 temporarily continues the standby state of the cryopump 10, and slightly delays start of the subsequent rough pumping of the cryopump 10. During the rough pumping standby time of the cryopump 10, a process which does not require the roughing pump 73 such as the purge gas infusion or the buildup determination may be performed.

To delay the start of the subsequent rough pumping for the cryopump 10, the CP controller 20 controls the rough valves 72 such that, when one of the rough valves 72 is open, any other rough valves 72 are forbidden to open. Further, the CP controller 20 temporarily continues the forbidding of opening of the other rough valves 72 even after the open rough valve 72 is closed. That is, the CP controller 20 sets a delay time or standby time from the closure of one of the rough valves 72 to the opening of a different one of the rough valves 72.

The cryopump system 100 comprises the plurality of cryopumps 10 including a first cryopump and a second cryopump. For ease of description, the first cryopump is referred to as "cryopump A", and the second cryopump is referred to as "cryopump B". Further, the rough valve 72 accompanying or associated with the cryopump A is referred to as "rough valve A", and the rough valve 72 accompanying or associated with the cryopump B is referred to as "rough valve B".

The method of regenerating the plurality of cryopumps 10 for the cryopump system 100 includes performing the steps of heating, discharging, and cooling for the cryopump A and the cryopump B, respectively.

The discharging step of the cryopump A includes a depressurizing step of the cryopump A through the rough line 90. The depressurizing step starts when the rough valve A is opened to connect the cryopump A to the roughing pump 73, and terminates when the rough valve A is closed to isolate the cryopump A from the rough line 90. The subsequent step of the depressurizing step for the cryopump A may be the infusion of a purge gas to the cryopump A, the buildup determination of the cryopump A, or the cooling of the cryopump A.

Similarly, the discharging step of the cryopump B includes a depressurizing step of the cryopump B through the rough line 90. The depressurizing step starts when the rough valve B is opened to connect the cryopump B to the roughing pump 73, and terminates when the rough valve B is closed to isolate the cryopump B from the rough line 90. The subsequent step of the depressurizing step for the cryopump B may be the infusion of a purge gas to the cryopump B, the buildup determination of the cryopump B, or the cooling of the cryopump B.

According to an exemplary embodiment of the present invention, during the parallel regeneration of the cryopump A and the cryopump B, the depressurizing step of the cryopump B may be executed subsequently to the depressurizing step of the cryopump A. As described above, the CP controller 20 is configured to set the delay time between an end of depressurizing of the cryopump A and start of depressurizing of the cryopump B. Therefore, the depressurizing step of the cryopump B is executed after the delay time passes from the depressurizing step of the cryopump A. More specifically, the delay time is set between closing of the open rough valve A and opening of the closed rough valve B, and the rough valve B is opened after the rough valve A is closed and the delay time passes.

In an embodiment, such a delay time is uniformly applied upon closing of each rough valve 72 for simplicity of control. The delay time may be a fixed preset value. The delay time is set to a time in which the pressure of the rough piping 92 is reduced to the base pressure level. The time may be based on characteristics of the rough line 90, for example, transient characteristics in pressure of the rough piping 92 caused by the roughing pump 73. The delay time is within, for example, ten seconds or less, and is preferably selected from a range of one second to three seconds.

Figure 4:
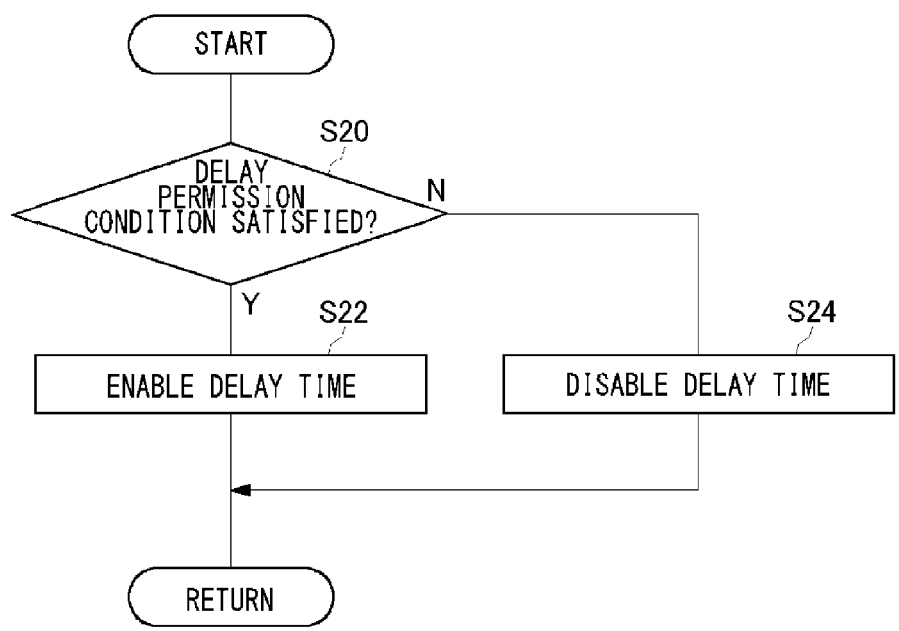
FIG. 4 shows a flowchart for describing a control process according to an exemplary embodiment of the present invention.

FIG. 4 shows a flowchart for describing a control process according to an exemplary embodiment of the present invention. The CP controller 20 may determine whether or not a delay permission condition is satisfied (S20). The delay permission condition may include a plurality of conditions, and the CP controller 20 may determine that the delay permission condition is satisfied if any one of the conditions is satisfied.

When the delay permission condition is satisfied (Y in S20), the CP controller 20 enables the delay time (S22). When the delay permission condition is not satisfied (N in S20), the CP controller 20 disables the delay time (S24). That is, the delay is applied when the delay permission condition is satisfied and otherwise the delay is not applied.

The CP controller 20 cyclically repeats executing this determining process for the delay permission during, for example, regeneration of the cryopump 10. After the regeneration of the cryopump 10 is started, the delay time is disabled before the delay permission condition has been satisfied. In this situation, the delay is not applied to the reconnecting operation of the roughing pump 73 between the plurality of cryopumps. The delay is applied while the delay permission condition is satisfied. When the delay permission condition is not satisfied again, the delay time is also disabled again, and then the delay is not applied.

During regeneration, rough pumping is typically executed more than one time in a cryopump. For example, when the status of the cryopump A is in the first half of the regeneration process and the status of the cryopump B is in the last half of the regeneration process, the cryopump B has been rough pumped at least once, prior to roughing of the cryopump A. The internal pressure of the cryopump becomes lower at the final stage of regenerating process compared to the initial stage of regeneration. When the cryopump A is first rough pumped and subsequently the cryopump B is rough pumped, the cryopump B may be of a lower pressure than that of the cryopump A For example, when the cryopump A is for example at the rough-and-purge step, which means before the buildup determination, and the cryopump B is in the middle or after the buildup determination, the initial pressure of rough pumping of the cryopump B can be lower than the final pressure of rough pumping of the cryopump A which is equal to the pressure at that time in the rough piping.

Consequently, the delay permission condition may be determined based on the status of at least one of the cryopumps 10, for example, the step of the regeneration process currently executed in the at least one of the cryopumps 10. In this case, the delay permission condition may include a condition that the buildup determination is being executed or has been executed at least once in any one of the cryopumps.

The delay permission condition may include a condition that the internal pressure of at least one of the plurality of cryopumps 10 is equal to or less than a predetermined pressure. For example, the delay permission condition may include a condition that the internal pressure of at least one of the plurality of cryopumps 10 is at the semi-base pressure level or the base pressure level. For example, the delay permission condition may include a condition that the pressure of at least one of the plurality of cryopumps 10 is 300 Pa or less, 200 Pa or less, 100 Pa or less, or 50 Pa or less. For example, the measured value of the pressure sensor 54 may be used for the internal pressure of the cryopump 10. Alternatively, a preset parameter for defining a rough pumping process, such as a predefined initial pressure of the rough pumping or a predefined final pressure of the rough pumping, may be used.

Further, the delay permission condition may be determined based on an operating state of one of the cryopumps 10 with the corresponding rough valve 72 being closed and an operating state of one of the cryopumps 10 with the corresponding rough valve 72 to be opened next. In this case, the delay permission condition may include a condition that the buildup determination has not been executed in a cryopumps 10 that is about to finish the rough pumping, and the buildup determination is being executed or has been executed at least once in another cryopump to be rough pumped next.

The delay permission condition may include a condition that the initial pressure of the rough pumping of the cryopump B is lower than the final pressure of rough pumping of the cryopump A. That is, the delay permission condition may include a condition that the internal pressure of the cryopump B that has the rough valve B to be opened next is lower than the internal pressure of the cryopump A that has the rough valve A to be closed. The condition may additionally include that the internal pressure of the cryopump B connected to the roughing pump 73 is the semi-base pressure level or the base pressure level. Meanwhile, the internal pressure of the cryopump 10 may be a measured value or a preset value. The pressure in the rough piping 92 may be used instead of the internal pressure of the cryopump 10 to be isolated from the roughing pump 73. For this purpose, the rough line 90 has a pressure sensor or a pressure switch for measuring the pressure in the rough piping 92.

According to an exemplary embodiment of the present invention, start of a new rough pumping in a cryopump 10 is delayed to some extent from the end of the last rough pumping in another cryopump 10. The roughing pump 73 can sufficiently depressurize the rough piping 92 during the delay time. Consequently, a transient pressure rise due to the rough piping 92 can be prevented at the start of the new rough pumping in the cryopump 10. Also, particles are prevented from entering the cryopump 10 from the rough piping 92.

In a high vacuum region for the roughing pump 73 such as the semi-base pressure level or in particular the base pressure level, a longer time is required for the same amount of depressurization compared to a low vacuum region (for example, the atmospheric pressure level). Accordingly, the transient pressure rise due to the rough piping 92 in the high vacuum region would require a time-consuming rough for recovery. The delay time is, however, about a few seconds for example, which is expected to be shorter than a time required for the recovery of pressure. Consequently, the total time required for regeneration can be shortened with adding the delay time.

The present invention has been described above based on the embodiments. It should be appreciated by those skilled in the art that the invention is not limited to the above embodiments but various design changes and variations can be made, and such variations are also encompassed by the present invention.

The duration of the delay time may not be necessarily fixed. For example, the delay time may be changed according to the pressure level of the cryopump 10 for which opening of the rough valve 72 is delayed. The delay time may be changed according to the pressure difference between a cryopump that has a rough valve to be opened and a cryopump that has a rough valve to be closed. Further, when the pressure of the rough piping 92 is sufficiently reduced in the middle of the delay time, the next rough valve 72 may be quickly opened by breaking off the delay time.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2011-108426, filed May 13, 2011, the entire content of which is incorporated herein by reference.

What is claimed is:

1. A cryopump system comprising:
    a plurality of cryopumps connected to a common roughing pump in a rough line and provided with a plurality of rough valves in the rough line, respectively; and
    a controller configured to control each of the rough valves for regenerating a corresponding one of the plurality of cryopumps,
    wherein a delay time is set between closing of an open one of the plurality of rough valves and opening of a closed one of the plurality of rough valves,
    wherein the controller applies the delay time uniformly upon closing of each of the rough valves.

2. The cryopump system according to claim 1, wherein the delay time is a fixed preset value.

3. The cryopump system according to claim 1, wherein the delay time is selected from a range of one second to ten seconds.

4. The cryopump system according to claim 1, wherein the delay time is selected from a range of one second to three seconds.

5. The cryopump system according to claim 1, wherein the delay time is set such that a pressure of a rough piping that connects the closed one of the plurality of rough valves to the roughing pump is depressurized within the delay time to a pressure lower than an internal pressure of a corresponding cryopump provided with the closed one of the plurality of rough valves.

6. The cryopump system according to claim 5, wherein the delay time is set to a time within which the pressure of the rough piping is reduced to a base pressure level that is an initial pressure for the cryopumps in operation.

* * * * *